United States Patent
Sasaki et al.

(10) Patent No.: US 10,537,966 B2
(45) Date of Patent: Jan. 21, 2020

(54) PROCESSING NOZZLE, PROCESSING HEAD, MACHINING APPARATUS, AND CONTROL METHOD AND CONTROL PROGRAM OF PROCESSING NOZZLE

(71) Applicant: TECHNOLOGY RESEARCH ASSOCIATION FOR FUTURE ADDITIVE MANUFACTURING, Tokyo (JP)

(72) Inventors: Yuji Sasaki, Yokohama (JP); Hiroshi Ohno, Yokohama (JP); Mitsuo Sasaki, Yokohama (JP); Takashi Obara, Yokohama (JP); Kazuyuki Masukawa, Yokohama (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 0 days.

(21) Appl. No.: 14/888,236

(22) PCT Filed: Mar. 4, 2015

(86) PCT No.: PCT/JP2015/056349
§ 371 (c)(1),
(2) Date: Oct. 30, 2015

(87) PCT Pub. No.: WO2016/139775
PCT Pub. Date: Sep. 9, 2016

(65) Prior Publication Data
US 2016/0375521 A1    Dec. 29, 2016

(51) Int. Cl.
*B23K 26/14*    (2014.01)
*B23K 26/144*   (2014.01)
(Continued)

(52) U.S. Cl.
CPC ...... *B23K 26/1476* (2013.01); *B23K 15/0026* (2013.01); *B23K 26/144* (2015.10); *B23K 26/34* (2013.01); *B23K 26/70* (2015.10)

(58) Field of Classification Search
CPC .. B23K 26/1476; B23K 26/144; B23K 26/70; B23K 15/0026; B23K 26/34
(Continued)

(56) References Cited

U.S. PATENT DOCUMENTS

| 5,418,350 A | 5/1995 | Freneaux et al. |
| 5,477,026 A | 12/1995 | Buongiorno |

(Continued)

FOREIGN PATENT DOCUMENTS

| JP | 10-501463 A | 2/1998 |
| JP | 11-333584 A | 12/1999 |

(Continued)

OTHER PUBLICATIONS

Japanese Office Action dated Oct. 11, 2016 for Japanese Application No. 2016-510537 with an English translation.
(Continued)

*Primary Examiner* — Dana Ross
*Assistant Examiner* — Joseph M Baillargeon
(74) *Attorney, Agent, or Firm* — Ladas & Parry LLP

(57) ABSTRACT

A machining apparatus that need not exchange a processing nozzle when changing a shaping condition, and increases the use efficiency of a material. The processing nozzle that performs processing by ejecting a processing material towards a molten pool formed on a process surface by an energy line includes a cylindrical inner housing that incorporates a path through which the energy line passes, and ejects the energy line from one end. The processing nozzle also includes a cylindrical outer housing that incorporates the inner housing, and has an inner surface tapered in the
(Continued)

ejection direction of the energy line ejected from the inner housing. The processing nozzle also includes a slide mechanism that changes, along the energy line, the relative position of the outer housing with respect to the inner housing.

7 Claims, 11 Drawing Sheets

(51) Int. Cl.
    *B23K 26/70* (2014.01)
    *B23K 15/00* (2006.01)
    *B23K 26/34* (2014.01)

(58) Field of Classification Search
    USPC ............ 219/121.17, 121.6, 121.66; 222/526, 222/478, 507, 630; 239/451, 455, 456, 239/458, 602, 417
    See application file for complete search history.

(56) References Cited

U.S. PATENT DOCUMENTS

| | | | |
|---|---|---|---|
| 5,486,676 A * | 1/1996 | Aleshin | ............... B23K 26/144 219/121.63 |
| 6,122,564 A | 9/2000 | Koch et al. | |
| 2006/0042436 A1 | 3/2006 | Closmann | |
| 2007/0193981 A1 | 8/2007 | Peng et al. | |
| 2008/0308538 A1 | 12/2008 | Harris et al. | |
| 2011/0089151 A1 * | 4/2011 | Miyagi | ............... B23K 26/147 219/121.66 |
| 2012/0145683 A1 * | 6/2012 | Miyagi | ............... B23K 26/147 219/121.64 |

FOREIGN PATENT DOCUMENTS

| | | |
|---|---|---|
| JP | 2002-519200 A | 7/2002 |
| JP | 2006-68819 A | 3/2006 |
| JP | 2007-222869 A | 9/2007 |
| JP | 2009-505812 A | 2/2009 |
| JP | 2011-88154 A | 5/2011 |
| WO | 95/20458 A1 | 8/1995 |
| WO | 00/00921 A1 | 1/2000 |

OTHER PUBLICATIONS

J-PlatPat English abstract of JP 2011-88154 A.
International Search Report (ISR) dated Jun. 17, 2015 for International Application No. PCT/JP2015/056349.
J-PlatPat English abstract of JP 2006-68819 A.
J-PlatPat English abstract of JP 2007-222869 A.
J-PlatPat English abstract of JP 11-333584 A.
Extended European Search Report dated Jan. 31, 2017 for corresponding EP Application No. 15785039.7.
Japanese Office Action (JPO) dated May 9, 2017 for Japanese Application No. 2016-510537.

* cited by examiner

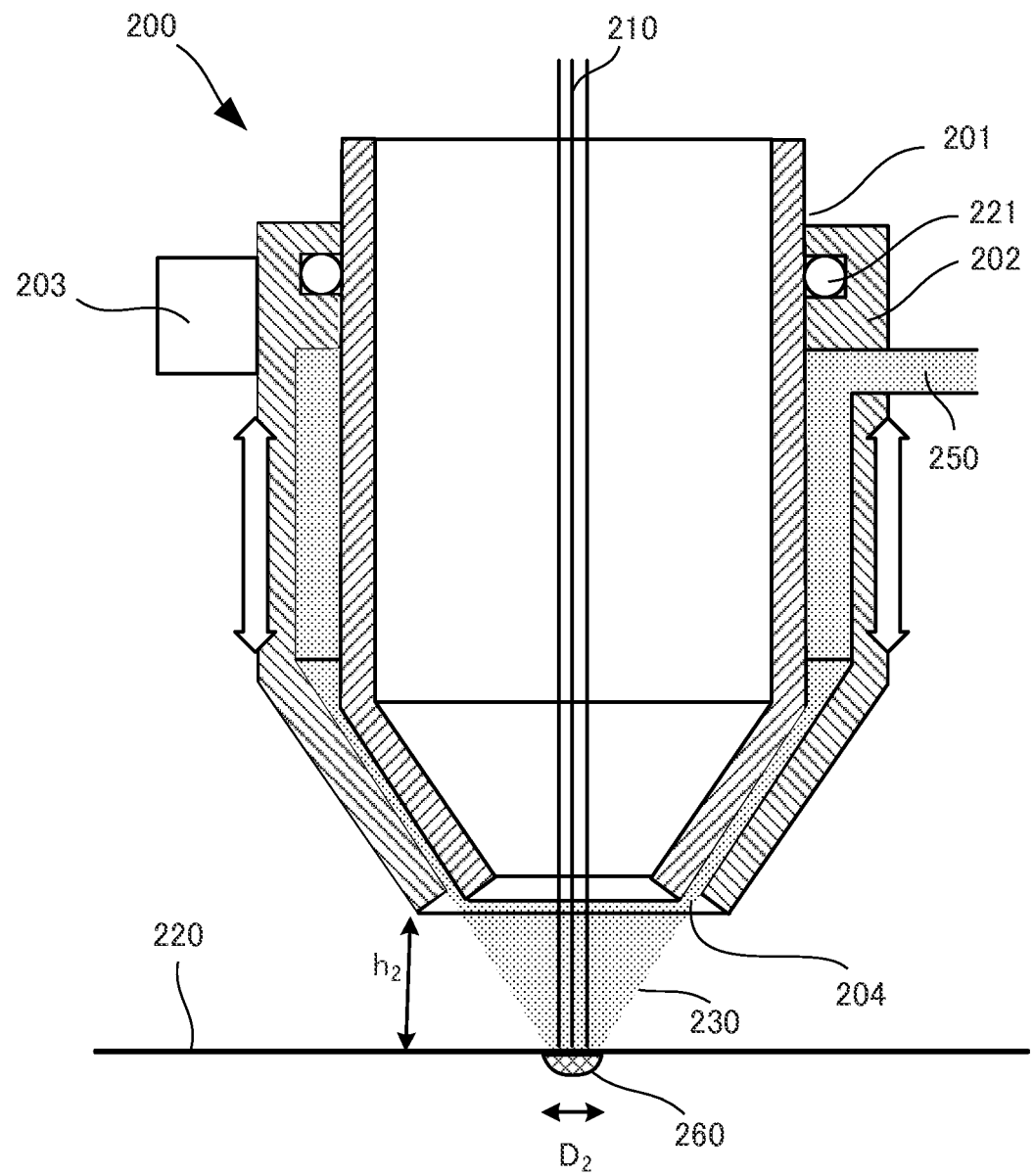
F I G. 4

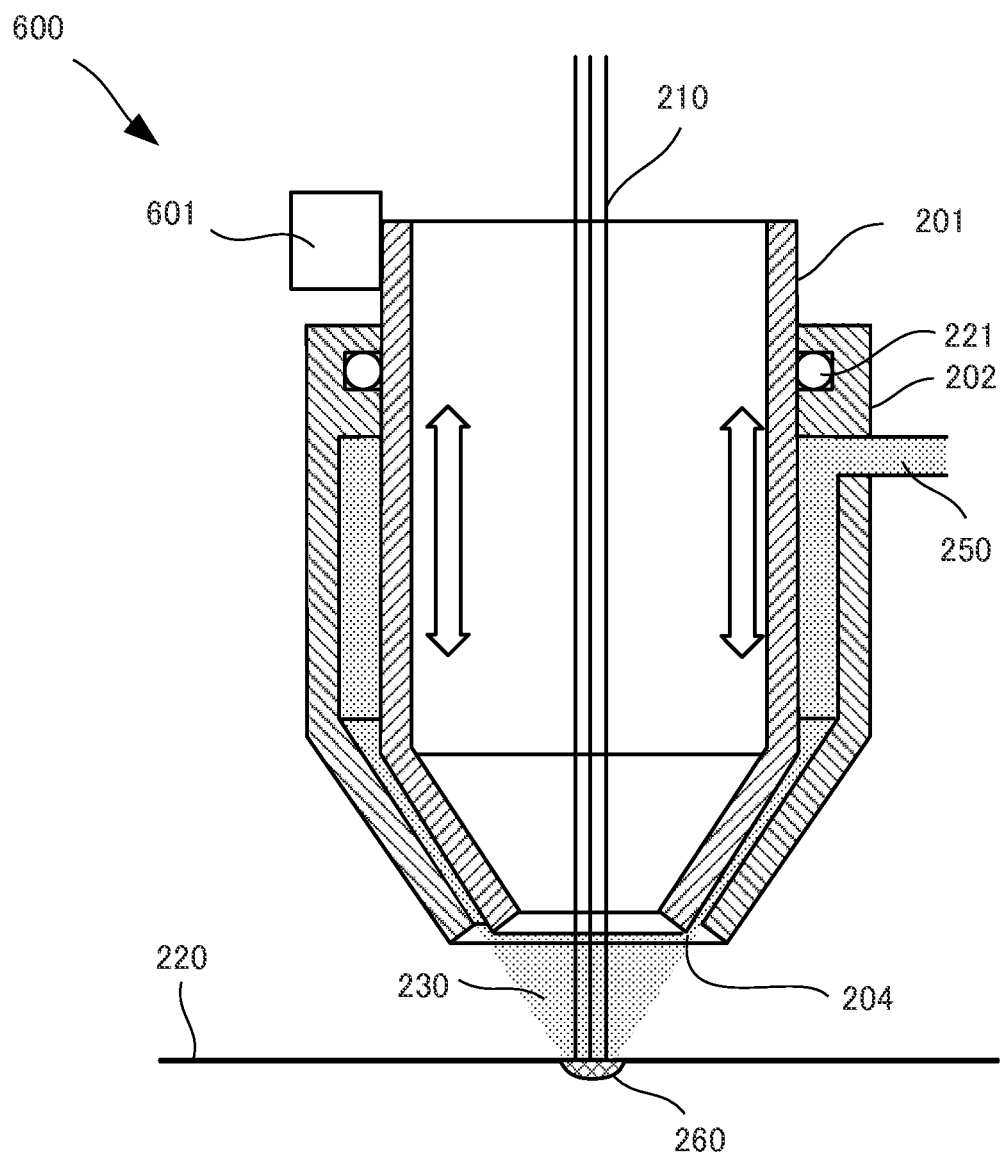
F I G. 6

PROCESSING NOZZLE, PROCESSING HEAD, MACHINING APPARATUS, AND CONTROL METHOD AND CONTROL PROGRAM OF PROCESSING NOZZLE

RELATED APPLICATION

This application is an application under 35 U.S.C. 371 of International Application No. PCT/JP015/056349 filed on Mar. 4, 2015, the entire contents of which are incorporated herein by reference.

TECHNICAL FIELD

The present invention relates to a processing nozzle, a processing head, a machining apparatus, and a control method and control program of the processing nozzle.

BACKGROUND ART

In the above technical field, patent literature 1 discloses a device that is the nozzle of a laser irradiation apparatus and ejects a material from a gap formed around the optical path of a laser beam in order to supply a material to a processing point.

CITATION LIST

Patent Literature

Patent literature 1: U.S. Pat. No. 5,418,350

SUMMARY OF THE INVENTION

Technical Problem

In the technique described in this literature, the spot position of a processing material ejected from the nozzle is fixed. For example, when changing a shaping condition from fine writing to bold writing, the condensing region of a laser beam and the spot region of the processing material do not have an appropriate relationship. To efficiently use the supplied material for shaping, it is necessary to prepare nozzles for fine writing and bold writing, and when switching the condition, exchange the nozzle main body.

The present invention enables to provide a technique of solving the above-described problem.

Solution to Problem

One aspect of the present invention provides a processing nozzle that performs processing by ejecting a processing material toward a molten pool formed on a process surface by an energy line, comprising:
  a cylindrical inner housing that incorporates a path through which the energy line passes, and ejects the energy line from one end;
  a cylindrical outer housing that incorporates the inner housing, and has an inner surface tapered in an ejection direction of the energy line ejected from the inner housing; and
  a slide mechanism that changes; along the energy line, a relative position of the outer housing with respect to the inner housing,
  wherein a gap between an outer surface of the inner housing and an inner surface of the outer housing forms an ejection port for the processing material, and a size of the ejection port changes in accordance with a change of the relative position by the slide mechanism.

Another aspect of the present invention provides a processing head comprising:
  the processing nozzle; and a condensing device that condenses the energy line.

Still other aspect of the present invention provides a machining apparatus comprising:
  the processing head; a material supply portion that supplies the processing material to the processing head; and a control unit that controls the slide mechanism and controls a spot diameter of the processing material.

Still other aspect of the present invention provides a method of controlling a processing nozzle including, in order to perform processing by ejecting an energy line to eject a processing material toward a molten pool formed on a process surface:
  a cylindrical inner housing that incorporates a path through which the energy line passes, and ejects the energy line from one end; and
  a cylindrical outer housing that incorporates the inner housing, and has an inner surface tapered in an ejection direction of the energy line ejected from the inner housing, the method comprising:
  changing, along the energy line, a relative position of the outer housing with respect to the inner housing, thereby changing a size of an ejection port for the processing material that is formed by a gap between an outer surface of the inner housing and an inner surface of the outer housing.

Still other aspect of the present invention provides a program of controlling a processing nozzle including, in order to perform processing by ejecting an energy line to eject a processing material toward a molten pool formed on a process surface:
  a cylindrical inner housing that incorporates a path through which the energy line passes, and ejects the energy line from one end; and
  a cylindrical outer housing that incorporates the inner housing, and has an inner surface tapered in an ejection direction of the energy line ejected from the inner housing, the program causing a computer to execute:
  inputting a shaping condition; and
  changing, in the ejection direction of the energy line, a relative position of the outer housing with respect to the inner housing in accordance with the shaping condition, thereby changing a size of an ejection port for the processing material that is formed by a gap between an outer surface of the inner housing and an inner surface of the outer housing.

Advantageous Effects of Invention

According to the present invention, even when changing a shaping condition, the nozzle need not be exchanged, and the use efficiency of a material can be increased.

BRIEF DESCRIPTION OF DRAWINGS

FIG. 4 is a schematic sectional view showing the arrangement of the processing nozzle according to the second embodiment of the present invention;

FIG. 6 is a schematic sectional view showing the arrangement of a processing nozzle according to the third embodiment of the present invention;

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
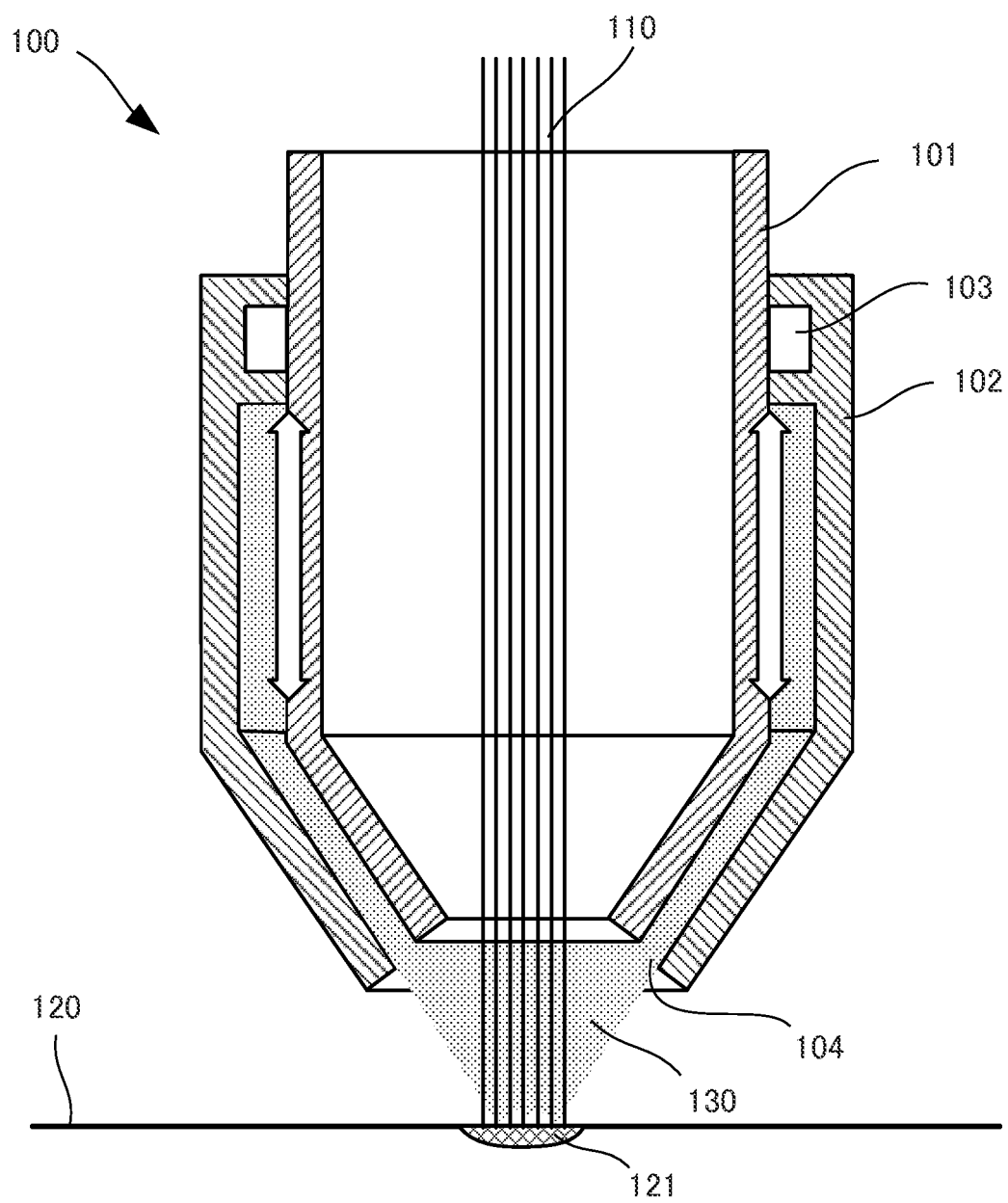
FIG. 1 is a schematic sectional view showing the arrangement of a processing nozzle according to the first embodiment of the present invention.

A processing nozzle 100 according to the first embodiment of the present invention will be described with reference to FIG. 1. FIG. 1 is a schematic sectional view showing the processing nozzle 100 according to this embodiment. The processing nozzle 100 is a nozzle for performing processing by ejecting a processing material 130 toward a molten pool 121 formed on a process surface 120 by an energy line 110. The processing nozzle 100 includes an inner housing 101, an outer housing 102, and a slide mechanism 103. The source of the energy line 110 is a laser source here, but can be an LED, a halogen lamp, or a xenon lamp. The energy line used to melt a material is not limited to the laser beam, and is arbitrary as long as the energy line can melt a processing material on a process surface. The energy line may be, for example, an electron beam, a microwave, or an electromagnetic wave in the ultraviolet range.

The inner housing 101 has a cylindrical shape, incorporates a path through which the energy line 110 passes, and ejects the energy line 110 from one end. The outer surface of the inner housing 101 is tapered in the ejection direction of the energy line 110 ejected from the inner housing 101. However, the outer surface of the inner housing 101 need not always be tapered.

The outer housing 102 also has a cylindrical shape, and incorporates the inner housing 101. The inner surface of the outer housing 102 is tapered in the ejection direction of the energy line 110 ejected from the inner housing 101. With this structure, the processing material 130 can be ejected toward the molten pool 121.

The slide mechanism 103 changes, along the energy line 110, the relative position of the outer housing 102 with respect to the inner housing 101.

The gap between the outer surface of the inner housing 101 and the inner surface of the outer housing 102 forms an ejection port 104 for the processing material 130. The size of the ejection port 104 changes in accordance with a change of the relative position by the slide mechanism 103.

In FIG. 1, the downstream ends of both the inner housing 101 and outer housing 102 have a conical cylindrical shape, but the present invention is not limited to this. For example, these two downstream ends may have a polygonal pyramid cylindrical shape. Alternatively, the inner housing 101 may have a circular cylindrical shape, and only the downstream end of the outer housing 102 may have a conical cylindrical shape.

With the above-described arrangement, even when changing a shaping condition, the processing nozzle need not be exchanged, and the ejection region of a processing material can be changed in accordance with the processing width. As a result, the processing accuracy and the use efficiency of the material can be increased.

Second Embodiment

Figure 2:
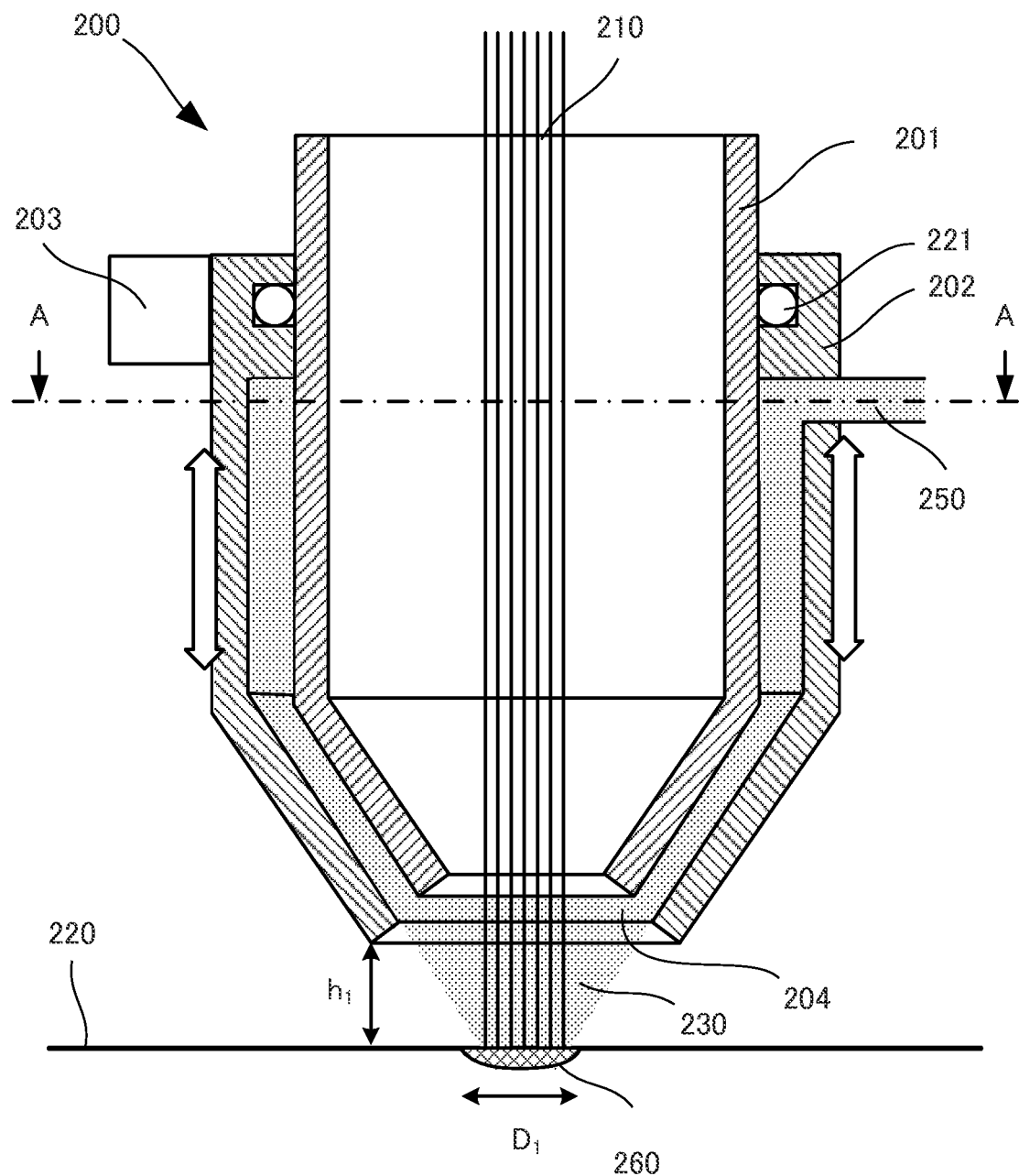
FIG. 2 is a schematic sectional view showing the arrangement of a processing nozzle according to the second embodiment of the present invention.

A processing nozzle according to the second embodiment of the present invention will be described with reference to FIG. 2. FIG. 2 is a schematic sectional view for explaining the internal arrangement of a processing nozzle 200 according to this embodiment.

The processing nozzle 200 is a nozzle for ejecting a powder 230 as a processing material toward a molten pool 260 formed on a process surface 220 by a laser beam 210 serving as an energy line. The processing nozzle 200 includes an inner housing 201, an outer housing 202, and a slide mechanism 203.

The inner housing 201 has a circular cylindrical shape, incorporates a path through which the laser beam 210 passes, and ejects the laser beam 210 from one end. The outer housing 202 also has a circular cylindrical shape, and incorporates the inner housing 201. Each of the inner housing 201 and the outer housing 202 has a structure tapered toward the optical axis of the laser beam 210.

Further, the processing nozzle 200 includes powder supply portions 250 that supply a powder-containing carrier gas to the gap between the outer surface of the inner housing 201 and the inner surface of the outer housing 202. A seal member 221 such as an O-ring is provided between the outer surface of the inner housing 201 and the upper end of the inner surface of the outer housing 202 in order to prevent leakage of the carrier gas.

The outer surface of the downstream end of the inner housing 201 and the inner surface of the downstream end of the outer housing 202 have a conical shape, and the ring-shaped gap serves as an ejection port 204.

The outer housing 202 is provided to be slidable in the optical axis direction of the laser beam 210. The slide mechanism 203 changes the relative position of the outer housing 202 with respect to the inner housing 201 along the optical axis of the laser beam 210. The size of the ejection port 204 changes in accordance with a change of the position of the outer housing 202 by the slide mechanism 203. The slide mechanism 203 moves the outer housing 202 via a linear motor or ball screw (not shown). However, the present invention is not limited to this, and another mechanism such as a rack and pinion may also be used A powder supplied to the processing nozzle 200 is supplied to the gap space between the inner housing 201 and the outer housing 202 from the powder supply portions 250 connected to the side surface of the outer housing 202. The supplied powder material is diffused in the gap space, and ejected from the ring-shaped ejection port 204 toward the process surface 220. When the outer housing 202 is slid in the optical axis direction with respect to the inner housing 201, the relative positions of the lower end portions of the inner housing 201 and outer housing 202 shift, and the shape of the ejection port 204 is changed, thereby changing the powder, ejection state.

More specifically, to set the fine writing mode, the slit width of the ring-shaped ejection port 204 can be decreased by sliding the outer housing 202 upward with respect to the inner housing 201, and the spot diameter of the material can be decreased. In contrast, the slit width of the ring-shaped ejection port 204 can be increased by sliding the outer housing 202 downward with respect to the inner housing 201, and the spot diameter can be increased to set the bold writing mode.

Figure 3:
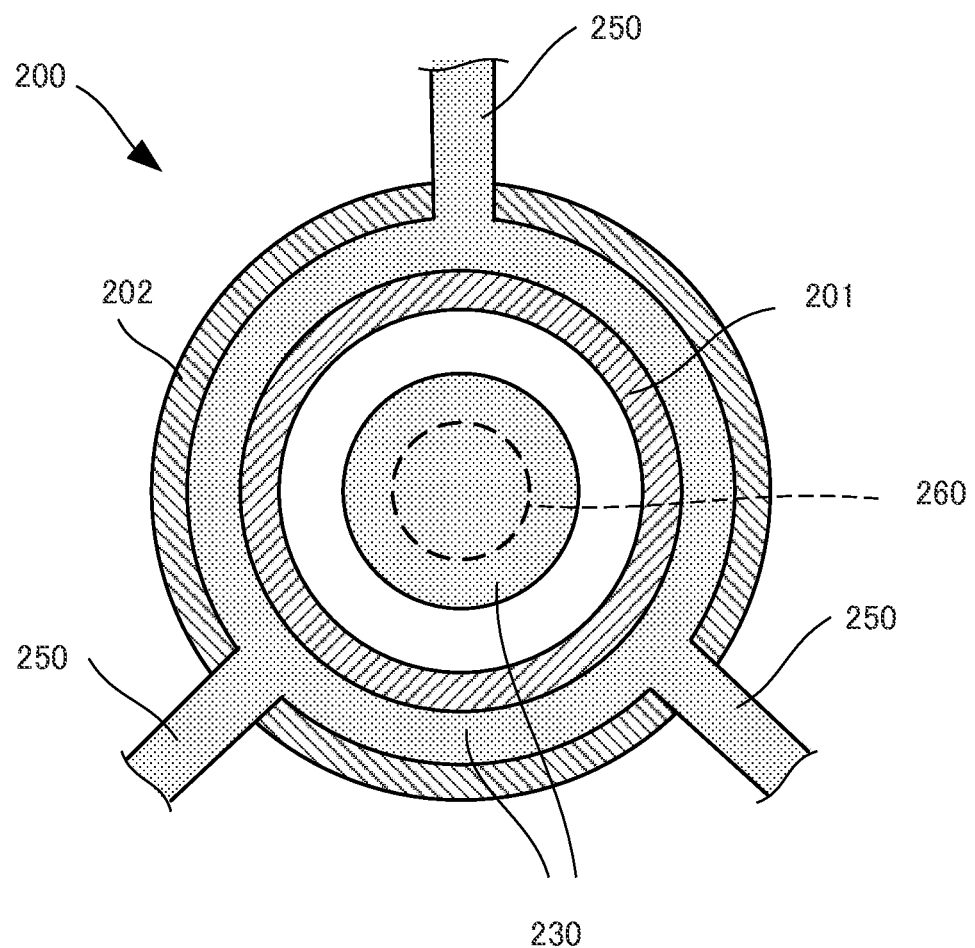
FIG. 3 is a schematic sectional view showing the arrangement of the processing nozzle according to the second embodiment of the present invention.

FIG. 3 is a sectional view taken along an A-A section in FIG. 2. As shown in FIG. 3, the powder supply portions 250 are arranged to evenly supply a powder from three portions to the outer housing 202. The powder is isotropically ejected to the molten pool 260, and high-accuracy processing can be implemented.

Figure 5A:
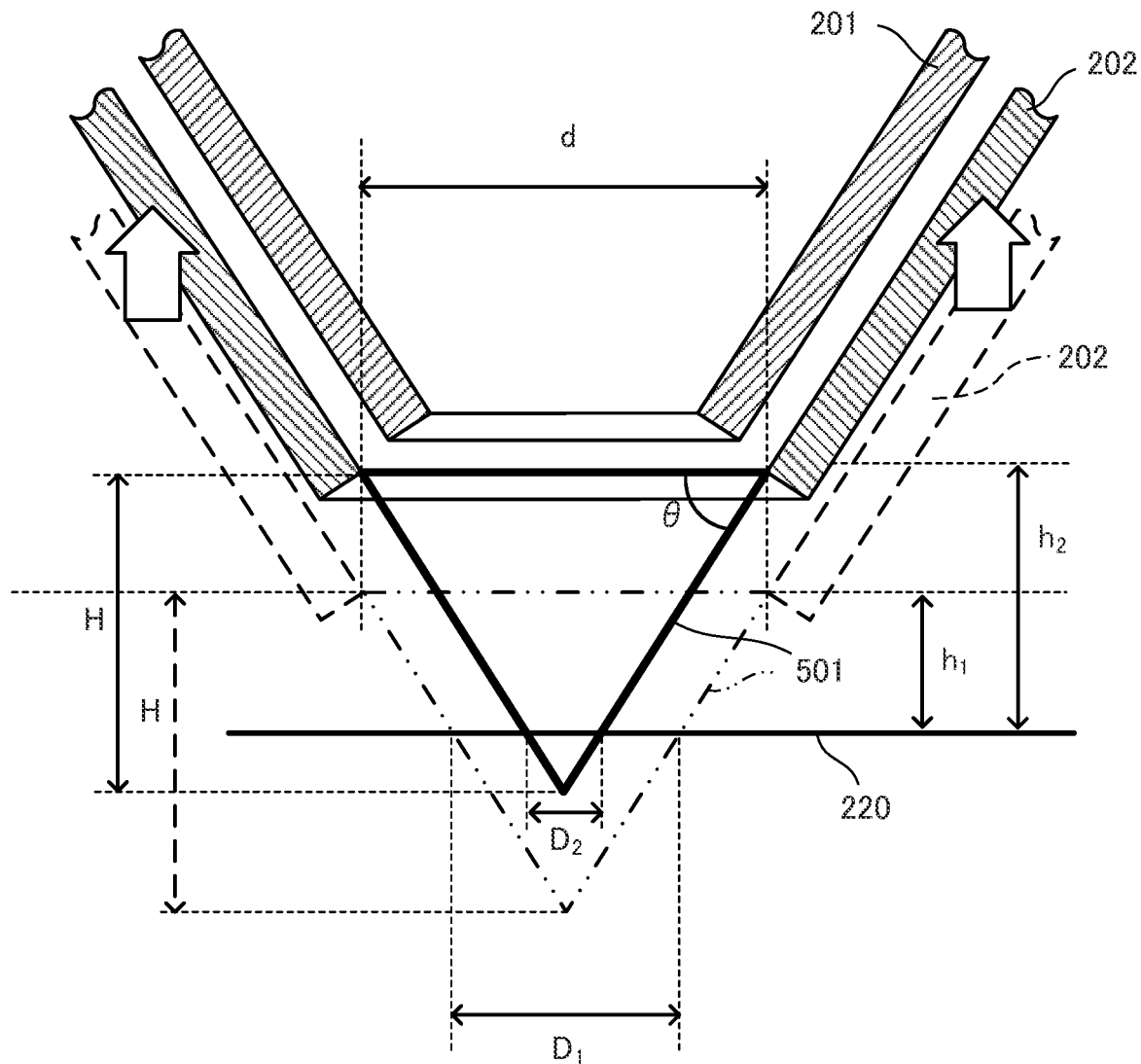
FIG. 5A is a view for explaining the operation of the processing nozzle according to the second embodiment of the present invention.

FIG. 4 is a view showing a state in which the ray of the laser beam 210 is narrowed and the outer housing 202 in FIG. 2 is slid upward in FIG. 4. By sliding the outer housing 202 from the position in FIG. 2 to the position in FIG. 4, the distance between the process surface 220 and the lower end face of the outer housing 202 increases from $h_1$ to $h_2$. In addition, the slit width of the ejection port 204 is decreased and the powder spot diameter is decreased. FIG. 5A shows states before and after the change. When the mode shifts from the bold writing mode to the fine writing mode and the width of the molten pool 260 changes from $D_1$ to $D_2$, the nozzle altitude is changed from $h_1$ to $h_2$ in order to change the powder spot diameter in accordance with this change. A method of calculating the nozzle altitude will be explained with reference to FIGS. 5A and 5B.

Figure 5B:
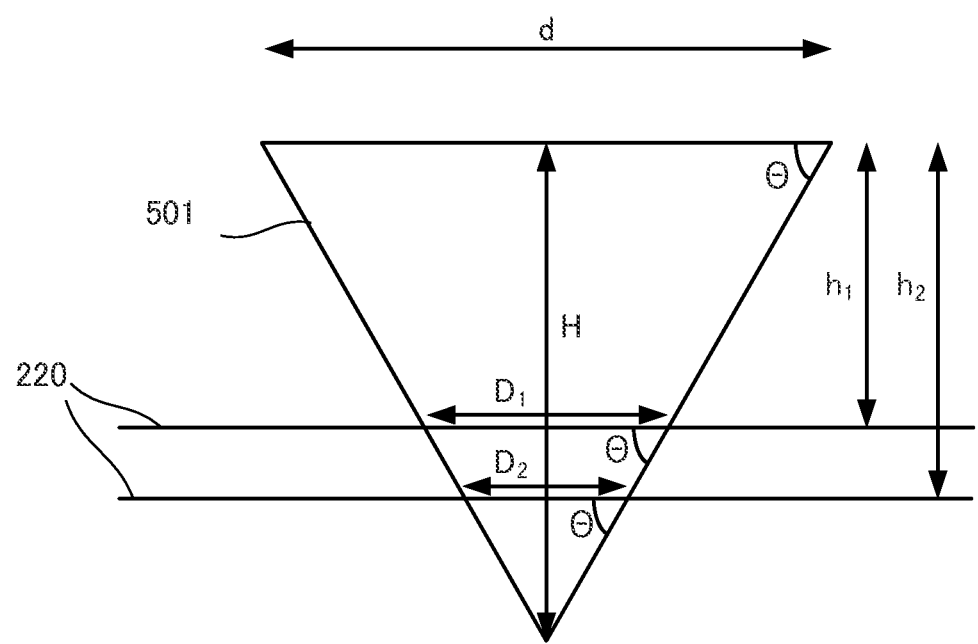
FIG. 5B is a view for explaining the operation of the processing nozzle according to the second embodiment of the present invention.

As shown in FIG. 5A, d represents the inner diameter of the end portion of the outer housing 202 on the side of the ejection port 204, and θ represents the inclination angle of the inner surface of the outer housing 202. Then, in a mode in which the same powder spot diameters as molten pool diameters $D_1$ and $D_2$ are implemented, when a triangle 501 having the base d and a height H is extracted, it can be modeled as shown in FIG. 5B. Hence, the distances $h_1$ and $h_2$ between the process surface 220 and the outer housing 202 are given by:

$$h_1 = H - (D_1/2)\tan\theta$$
$$= (d/2)\tan\theta - (D_1/2)\tan\theta$$
$$= \{(d - D_1)\tan\theta\}/2$$
$$h_2 = \{(d - D_2)\tan\theta\}/2$$

To the contrary, in a mode in which the powder spot diameters are set to be 90% of the molten pool diameters $D_1$ and $D_2$ in order to further suppress waste of the powder, the distances $h_1$ and $h_2$ are given by:

$$h_1 = \{(d-0.9D_1)\tan\theta\}/2$$
$$h_2 = \{(d-0.9D_2)\tan\theta\}/2$$

In contrast, in a mode in which the powder spot diameter is set to be 120% of the molten pool diameters $D_1$ and $D_2$ in order to increase the processing speed by supplying a large amount of powder so as to prevent shortage of the powder, the distances $h_1$ and $h_2$ are given by:

$$h_1 = \{(d-1.2D_1)\tan\theta\}/2$$
$$h_2 = \{(d-1.2D_2)\tan\theta\}/2$$

For example, when θ=60°, d=10 mm, and $h_1$=5 mm, the powder spot diameter becomes half for $h_2$=6.825 mm. When $h_1$=6 mm, the powder spot diameter becomes half for $h_2$=7.325 mm. For example, when θ=60°, d=10 mm, and $h_1$=4 mm, the powder spot diameter becomes ⅓ for $h_2$=7.1 mm.

With the above-described arrangement, even when changing a shaping condition, the processing nozzle need not be exchanged, and the ejection diameter and ejection amount of a processing material can be changed in accordance with the molten pool diameter. As a result, the processing accuracy and the use efficiency of the material can be increased.

Note that the relative positions of the inner housing 201 and outer housing 202 may be changed by engaging thread grooves provided on the outer surface of the inner housing and the inner surface of the outer housing. For example, it is also possible to fix the outer housing 202, rotate the inner housing 201, and slide the inner housing 201 with respect to the outer housing 202 along the optical axis.

Third Embodiment

Figure 7:
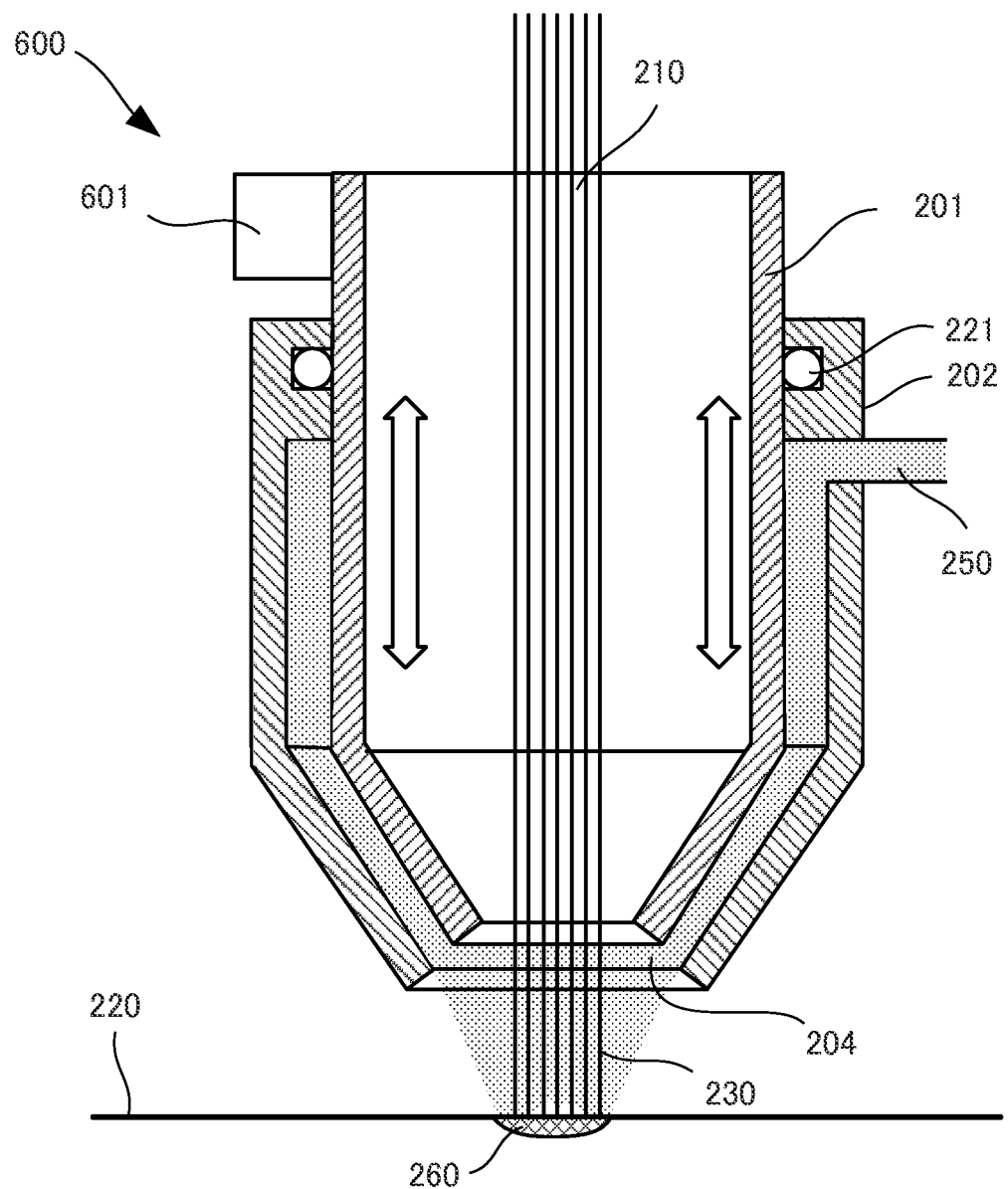
FIG. 7 is a schematic sectional view showing the arrangement of the processing nozzle according to the third embodiment of the present invention.

A processing nozzle according to the third embodiment of the present invention will be described with reference to FIGS. 6 and 7. FIGS. 6 and 7 are schematic sectional views for explaining the internal arrangement of a processing nozzle 600 according to this embodiment. The processing nozzle 600 according to the third embodiment is different from the processing nozzle according to the second embodiment in that it includes a slide mechanism 601 for sliding an inner housing 201. The remaining arrangement and operation are the same as those in the second embodiment, so the same reference numerals denote the same arrangement and operation and a detailed description thereof will not be repeated.

In FIG. 6, the inner housing 201 is slid downward. Hence, an ejection port 204 can be narrowed to decrease the powder spot in accordance with the diameter of a molten pool 260.

To the contrary, in FIG. 7, the inner housing 201 is slid upward. The opening area of the ejection port 204 is increased to increase the amount of a powder to be ejected. Thus, the powder spot can be increased in accordance with the diameter of the molten pool 260.

With the above-described arrangement, even when changing a shaping condition, the processing nozzle need not be exchanged, and the ejection diameter and ejection amount of a processing material can be changed in accordance with the molten pool diameter. As a result, the processing accuracy and the use efficiency of the material can be increased.

Fourth Embodiment

In the above-described embodiments, only either of the inner housing and outer housing is slid. However, the present invention is not limited to this, and both of the inner housing and outer housing may be simultaneously slid up and down. For example, when increasing a laser output and raising the processing temperature, it is desirable to increase the distance between the nozzle and the process surface, and reduce damage to the nozzle by thermal radiation from the processing point.

Figure 8:
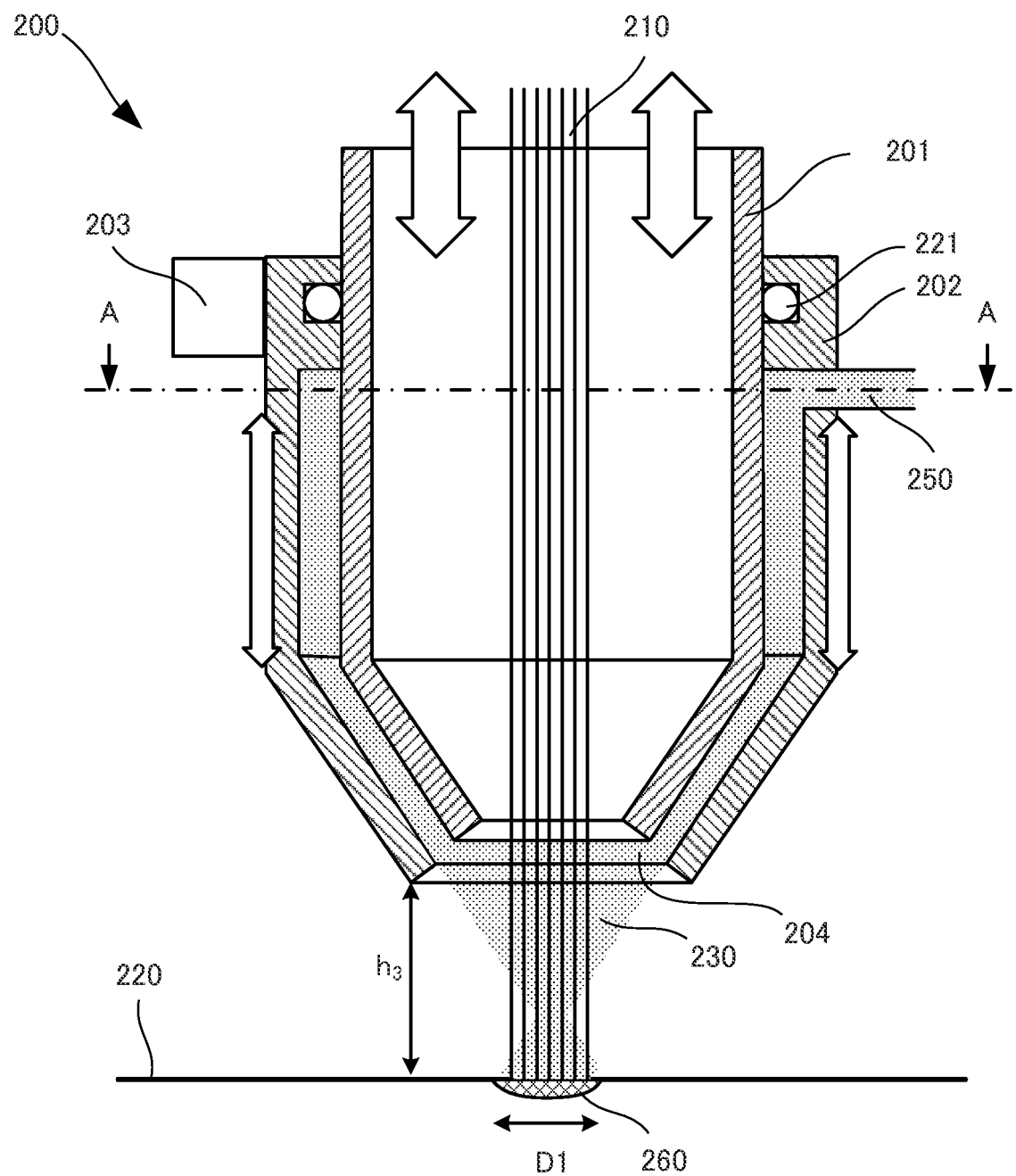
FIG. 8 is a schematic sectional view showing the arrangement of a processing nozzle according to the fourth embodiment of the present invention.
Figure 9:
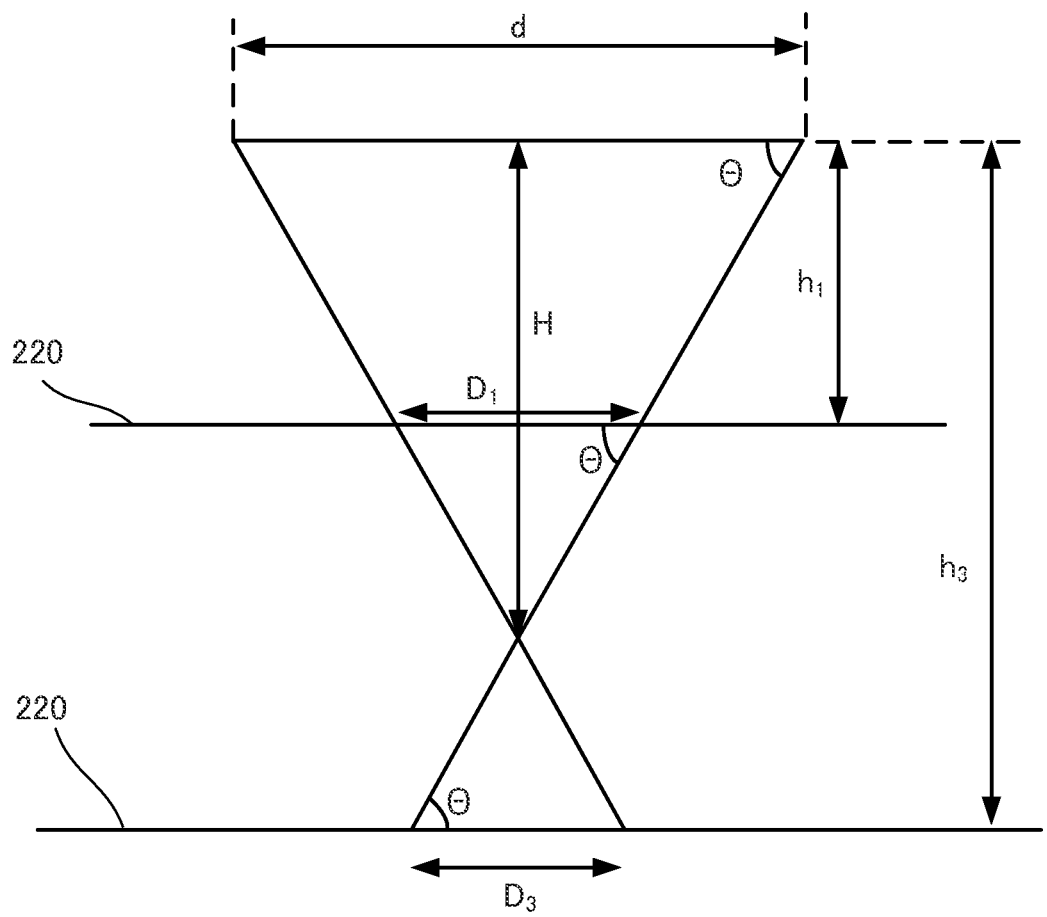
FIG. 9 is a view for explaining the operation of the processing nozzle according to the fourth embodiment of the present invention.

Both the inner housing and outer housing may be moved upward without changing the powder spot diameter, as shown in FIG. 8. In this case, $h_3$ can be derived using a model shown in FIG. 9, as in FIG. 5B:

$$h_3 = (d/2)\tan\theta + (D_3/2)\tan\theta$$
$$= [(d + D_3)/2]\tan\theta$$

If the overall nozzle is shifted upward by $D_1 \times \tan\theta$ for the same molten pool diameter $D_1$, damage to the nozzle by thermal radiation from the processing point can be reduced without changing the powder spot diameter.

According to the fourth embodiment, the distance between the nozzle and the process surface can be changed while maintaining the powder spot diameter.

Fifth Embodiment

Figure 10:
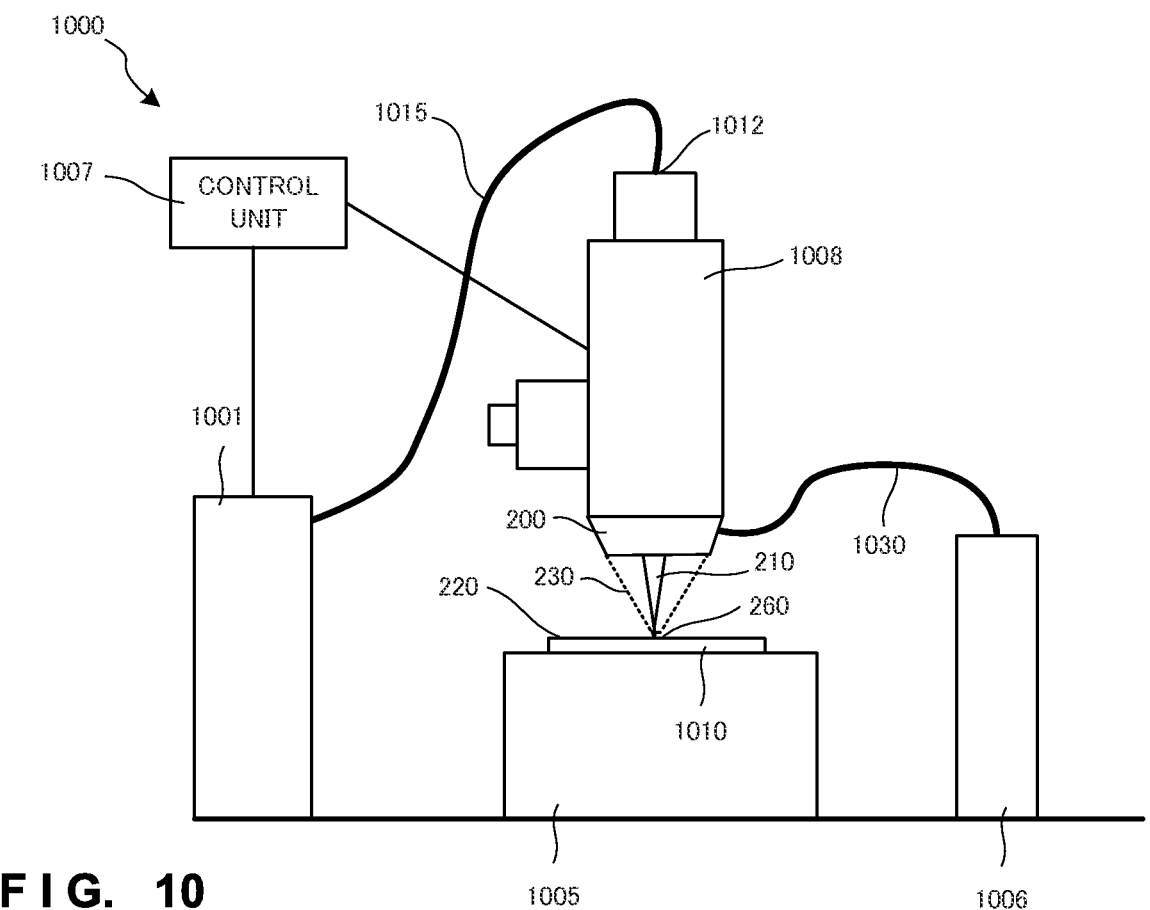
FIG. 10 is a view showing the arrangement of a machining apparatus according to the fifth embodiment of the present invention.

An optical machining apparatus 1000 according to the fifth embodiment of the present invention will be described with reference to FIG. 10. The optical machining apparatus 1000 is an apparatus that includes one of the processing nozzles 100, 200, and 600 explained in the above-described embodiments, and generates a three-dimensional shaped object (or overlay welding) by melting a material by heat generated by condensed light. Here, the optical machining apparatus 1000 including a processing nozzle 200 will be explained as an example.

<<Apparatus Arrangement>>

The optical machining apparatus 1000 includes a light source 1001, a light transmitting portion 1015, a stage 1005, a material storage device 1006, a material supply portion 1030, a processing head 1008, and a control unit 1007.

The light source 1001 is a laser source here, but can be an LED, a halogen lamp, or a xenon lamp. The energy line used to melt a material is not limited to the laser beam, and is arbitrary as long as the energy line can melt a powder material at a processing point. The energy line may be, for example, an electron beam, a microwave, or an electromagnetic wave in the ultraviolet range.

The light transmitting portion 1015 is, for example, an optical fiber having a core diameter of ϕ0.01 to 1 mm, and guides light generated by the light source 1001 to the processing head 1008.

The material storage device 1006 supplies a material-containing carrier gas to the processing head 1008 via the material supply portion 1030. The material is, for example, a particle such as a metal particle or a resin particle. The carrier gas is an inert gas and can be, for example, argon gas, nitrogen gas, or helium gas.

The material supply portion 1030 is, for example, a resin or metal hose, and guides, to the processing head 1008, a powder flow prepared by mixing a material in a carrier gas. However, when the material is a wire, no carrier gas is necessary.

The processing head 1008 incorporates a condensing device 1012 that condenses light serving as the energy line.

The processing nozzle 200 is attached downstream of the condensing device. A laser beam supplied to the processing head 1008 is adjusted to be condensed on a process surface 220 through an optical system formed from a lens provided inside and the like. The laser beam irradiates the process surface 220 through the inside of the processing nozzle 200. The optical system is provided to be able to control the condensing position by controlling the lens interval or the like.

The control unit 1007 receives a shaping condition such as fine writing or bold writing, changes the output value of a laser beam from the light source 1001 in accordance with the received shaping condition, and slides the outer housing 202 of the processing nozzle 200. By this processing, the control unit 1007 controls the powder spot diameter of a powder ejected from the processing nozzle 200 in accordance with the molten pool diameter.

<<Apparatus Operation>>

Next, the operation of the optical machining apparatus 1000 will be explained. A shaped object 1010 is created on the stage 1005. Light emitted by the processing head 1008 is condensed to the process surface 220 on the shaped object 1010. The temperature of the process surface 220 is raised by the condensed light, and the process surface 220 is melted, partially forming a molten pool.

The material is ejected from the processing nozzle 200 to the molten pool 260 of the process surface 220. The material is melted into the molten pool 260. After that, the molten pool 260 is cooled and hardened to deposit the material on the process surface 220, implementing three-dimensional shaping.

With the above-described arrangement, while controlling the condensing position of a laser beam, the spot position of a powder material can be controlled to perform adjustment complying with the size of the molten region. Since adjustment coping with a change of the processing condition can be performed without exchanging the processing nozzle in every adjustment, the powder material can be efficiently supplied to the molten region.

Other Embodiments

The present invention has been described above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments. Further, the present invention is also applicable even when a control program for implementing the functions of the embodiments is supplied to the system or apparatus directly or from a remote site site. Hence, the present invention also incorporates the program installed in a computer to implement the functions of the present invention on the computer, a medium storing the program, and a WWW (World Wide Web) server that causes a user to download the program. Especially, a non-transitory computer readable medium storing a program for causing a computer to execute processing steps included in the above-described embodiments falls within the scope of the present invention.

The invention claimed is:

1. A processing nozzle that performs processing by ejecting a processing material towards a molten pool formed on a process surface by an energy line, comprising:

a cylindrical inner housing that incorporates a path through which the energy line passes, and ejects the energy line from one end;

a cylindrical outer housing that incorporates said inner housing, and has an inner surface tapered in an ejection direction of the energy line ejected from said inner housing;

wherein the outer housing and inner housing are slidable relative to each other so as to enable change, along the energy line, of a relative position of said outer housing with respect to said inner housing, wherein an outer surface of the inner housing and the inner surface of the outer housing define a gap that provides a flow channel for conveying the processing material ejected by the processing nozzle along the inner surface of the outer housing and the gap forms an ejection port through which the processing material is ejected toward the process surface, wherein the outer surface of the inner housing and the inner surface of the outer housing are disposed with respect to one another such that, when the outer housing is slid relative to the inner housing so that a distance h between the process surface and said outer housing varies between a plurality of distances and the processing material is conveyed through the flow channel and ejected from the ejection port with the outer housing disposed at any of the plurality of distances from the process surface, a relationship between a diameter of the molten pool and the distance h between the process surface and said outer housing is defined by a formula of:

$$h=\{(d-\alpha D)\tan\theta\}/2$$

where d represents the inner diameter of an end portion of said outer housing on the side of the ejection port, θ represents an inclination angle of the inner surface of said outer housing, D represents the molten pool diameter, and α represents a ratio of a spot diameter of the processing material to the molten pool diameter, and wherein the outer housing is slidable to control the molten pool diameter without changing the processing material delivery angle.

2. The processing nozzle according to claim 1, wherein said outer housing slides, along the energy line, with respect to said inner housing, which is fixed, upward by D×tan θ.

3. A processing head comprising:
a processing nozzle defined in claim 1; and
a condensing device that condenses the energy line.

4. A machining apparatus comprising:
a processing head defined in claim 3;
a material supply portion that supplies the processing material to said processing head; and
a control unit that controls a relative position of the outer housing with respect to the inner housing and controls a spot diameter of the processing material.

5. A method of controlling a processing nozzle including, in order to perform processing by ejecting a processing material towards a molten pool formed on a process surface by an energy line:
a cylindrical inner housing that incorporates a path through which the energy line passes, and ejects the energy line from one end; and
a cylindrical outer housing that incorporates the inner housing, and has an inner surface tapered in an ejection direction of the energy line ejected from the inner housing, the method comprising:

changing, along the energy line, a relative position of the outer housing with respect to the inner housing, thereby changing a size of an ejection port for the processing material that is formed by a gap between an outer surface of the inner housing and an inner surface of the outer housing, wherein the outer surface of the inner housing and the inner surface of the outer housing are disposed with respect to one another such that, when the relative position of the outer housing with respect to the inner housing is changed and a distance h between the process surface and said outer housing varies between a plurality of distances such that the processing material can be conveyed through the gap and ejected from the ejection port onto the molten pool with the outer housing disposed at any of the plurality of distances from the process surface, a relationship between a diameter of the molten pool and the distance h between the process surface and the outer housing is defined by a formula of:

$$h=\{(d-\alpha D)\tan\theta\}/2$$

where d represents the inner diameter of an end portion of the outer housing on the side of the ejection port, θ represents an inclination angle of the inner surface of the outer housing, D represents a molten pool diameter, and α represents a ratio of a spot diameter of the processing material to the molten pool diameter, and wherein the outer housing is slidable to control the molten pool diameter without changing the processing material delivery angle.

6. A non-transitory computer-readable medium storing a program which, when executed by a processor, causes the processor to perform a method of controlling a processing nozzle including, in order to perform processing by ejecting an energy line to eject a processing material towards a molten pool formed on a process surface:
a cylindrical inner housing that incorporates a path through which the energy line passes, and ejects the energy line from one end; and
a cylindrical outer housing that incorporates the inner housing, and has an inner surface tapered in an ejection direction of the energy line ejected from the inner housing, the method causing the computer to execute:
inputting a shaping condition; and
changing, in the ejection direction of the energy line, a relative position of the outer housing with respect to the inner housing in accordance with the shaping condition, thereby changing a size of an ejection port for the processing material that is formed by a gap between an outer surface of the inner housing and an inner surface of the outer housing, wherein an outer surface of the inner housing and an inner surface of the outer housing are disposed with respect to one another such that, when the relative position of the outer housing with respect to the inner housing is changed and a distance h between the process surface and said outer housing varies between a plurality of distances such that the processing material can be conveyed through the gap and ejected from the ejection port onto the molten pool with the outer housing disposed at any of the plurality of distances from the process surface, a relationship between a diameter of the molten pool and the distance h between the process surface and the outer housing is defined by a formula of:

$$h=\{(d-\alpha D)\tan\theta\}/2$$

where d represents the inner diameter of an end portion of the outer housing on the side of the ejection port, $\theta$ represents an inclination angle of the inner surface of the outer housing, D represents a molten pool diameter, and $\alpha$ represents a ratio of a spot diameter of the processing material to the molten pool diameter, and wherein the outer housing is slidable to control the molten pool diameter without changing the processing material delivery angle.

7. A system that performs processing by ejecting a processing material towards a molten pool formed on a process surface by an energy line, comprising: a processing head, a material supply portion that supplies the processing material to said processing head; and a control unit, wherein said processing head comprises:

a cylindrical inner housing that incorporates a path through which the energy line passes, and ejects the energy line from one end;

a cylindrical outer housing that incorporates said inner housing, and has an inner surface tapered in an ejection direction of the energy line ejected from said inner housing; wherein the outer housing and inner housing are slidable relative to each other so as to enable change, along the energy line, of a relative position of said outer housing with respect to said inner housing; and a condensing device that condenses the energy line, wherein an outer surface of the inner housing and an inner surface of the outer housing define a gap through which the processing material can flow and be ejected onto the molten pool, and wherein the outer surface of the inner housing and the inner surface of the outer housing are disposed with respect to one another such that, when the relative position of the outer housing with respect to the inner housing is changed and a distance h between the process surface and said outer housing varies between a plurality of distances such that the processing material can be conveyed through the gap and ejected onto the molten pool with the outer housing disposed at any of the plurality of distances from the process surface, a relationship between a diameter of the molten pool and the distance h between the process surface and the outer housing is defined by a formula:

$$h=\{(d-\alpha D)\tan\theta\}/2$$

where d represents the inner diameter of an end portion of the outer housing on the side of the ejection port, $\theta$ represents an inclination angle of the inner surface of the outer housing, D represents a molten pool diameter, and $\alpha$ represents a ratio of a spot diameter of the processing material to the molten pool diameter, wherein the control unit controls the relative position of said outer housing with respect to said inner housing, and wherein the outer housing is slidable to control the molten pool diameter without changing the processing material delivery angle.

* * * * *